(12) United States Patent
Huang

(10) Patent No.: US 8,717,754 B2
(45) Date of Patent: May 6, 2014

(54) HARD DISK DRIVE MOUNTING DEVICE

(75) Inventor: Fu-Kuo Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/444,980

(22) Filed: Apr. 12, 2012

(65) Prior Publication Data

US 2013/0033814 A1 Feb. 7, 2013

(30) Foreign Application Priority Data

Aug. 4, 2011 (TW) .............................. 100127664 A

(51) Int. Cl.
*F16M 1/021* (2006.01)
*G06F 1/16* (2006.01)

(52) U.S. Cl.
CPC ............. *F16M 1/021* (2013.01); *G06F 1/1626* (2013.01)
USPC .................... 361/679.37; 248/309.1; 312/236; 360/97.15

(58) Field of Classification Search
CPC ......... F16M 1/00; G06F 1/1626; H01L 21/00
USPC ......... 206/216, 524.1, 702; 248/122.1, 316.4, 248/206.5, 205.1, 452, 97.1, 163.1, 309.1, 248/222.51; 361/679.32, 679.33, 679.31, 361/679.57, 679.27, 679.01, 679.37, 361/679.09, 679.4, 679.39, 679.48, 679.36, 361/679.21, 679.08, 679.02, 679.58; 396/350, 419; 312/223.1, 223.2, 223.3, 312/236, 111, 222; 360/97.13, 133, 92.1, 360/90, 137, 97.15, 99.15
See application file for complete search history.

(56) References Cited

U.S. PATENT DOCUMENTS

| | | | |
|---|---|---|---|
| 2009/0091884 A1* | 4/2009 | Walker et al. | 361/679.37 |
| 2009/0273896 A1* | 11/2009 | Walker et al. | 361/679.33 |
| 2010/0259884 A1* | 10/2010 | Wang et al. | 361/679.33 |

* cited by examiner

*Primary Examiner* — Hung Duong
(74) *Attorney, Agent, or Firm* — Novak Druce Connolly Bove + Quigg LLP

(57) ABSTRACT

A mounting device for hard disk drive includes a cage and a frame. The cage defines a receiving space. The receiving space includes a bottom plate. The frame includes a mounting plate and two limiting plates. The hard disk drive is secured between the two limiting plates. A gap is defined between the mounting plate and the bottom plate. A positioning protrusion is located on the bottom plate. A first mounting piece and a second mounting piece extend from the mounting plate. Two positioning pieces extend from the first mounting piece. The second mounting piece abuts the positioning protrusion, the first mounting piece and the second mounting piece are secured to the positioning protrusion, and the two positioning pieces abut the bottom plate, to prevent the second mounting piece from jolting towards the bottom plate.

19 Claims, 4 Drawing Sheets

HARD DISK DRIVE MOUNTING DEVICE

BACKGROUND

1. Technical Field

The present disclosure relates to mounting devices for hard disk drives, and particularly to a mounting device for hard disk drive in a notebook or a netbook.

2. Description of Related Art

A hard disk drive is generally used for data storage in a notebook or a netbook. Many hard disk drives are secured to a mounting bracket, and the mounting bracket is secured to an enclosure of the notebook or the netbook. The mounting bracket may include a sidewall. A locking piece may extend from the sidewall. A screw may be inserted through the locking piece and a bottom plate of the enclosure to secure the sidewall to the bottom plate. A gap may be defined between the sidewall and the bottom plate for a plurality of data cables to pass through. Thus, the locking piece and the sidewall are hung from the bottom plate. When the mounting bracket and the hard disk drive are jolted, the sidewall may easily be deformed and cause the locking piece to fall against the bottom plate.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
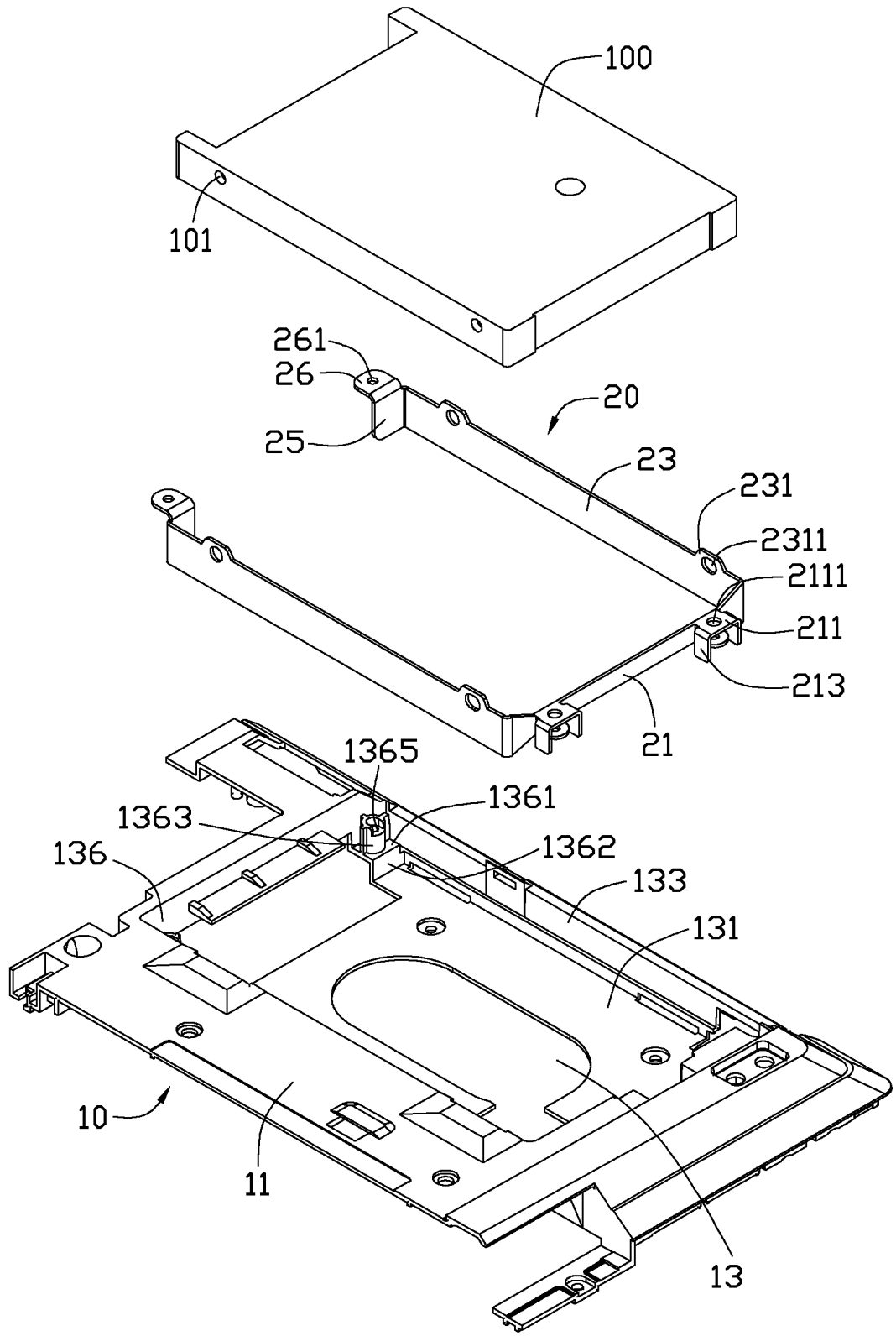
FIG. 1 is an exploded, isometric view of an embodiment of a mounting device and a hard disk drive.
Figure 2:
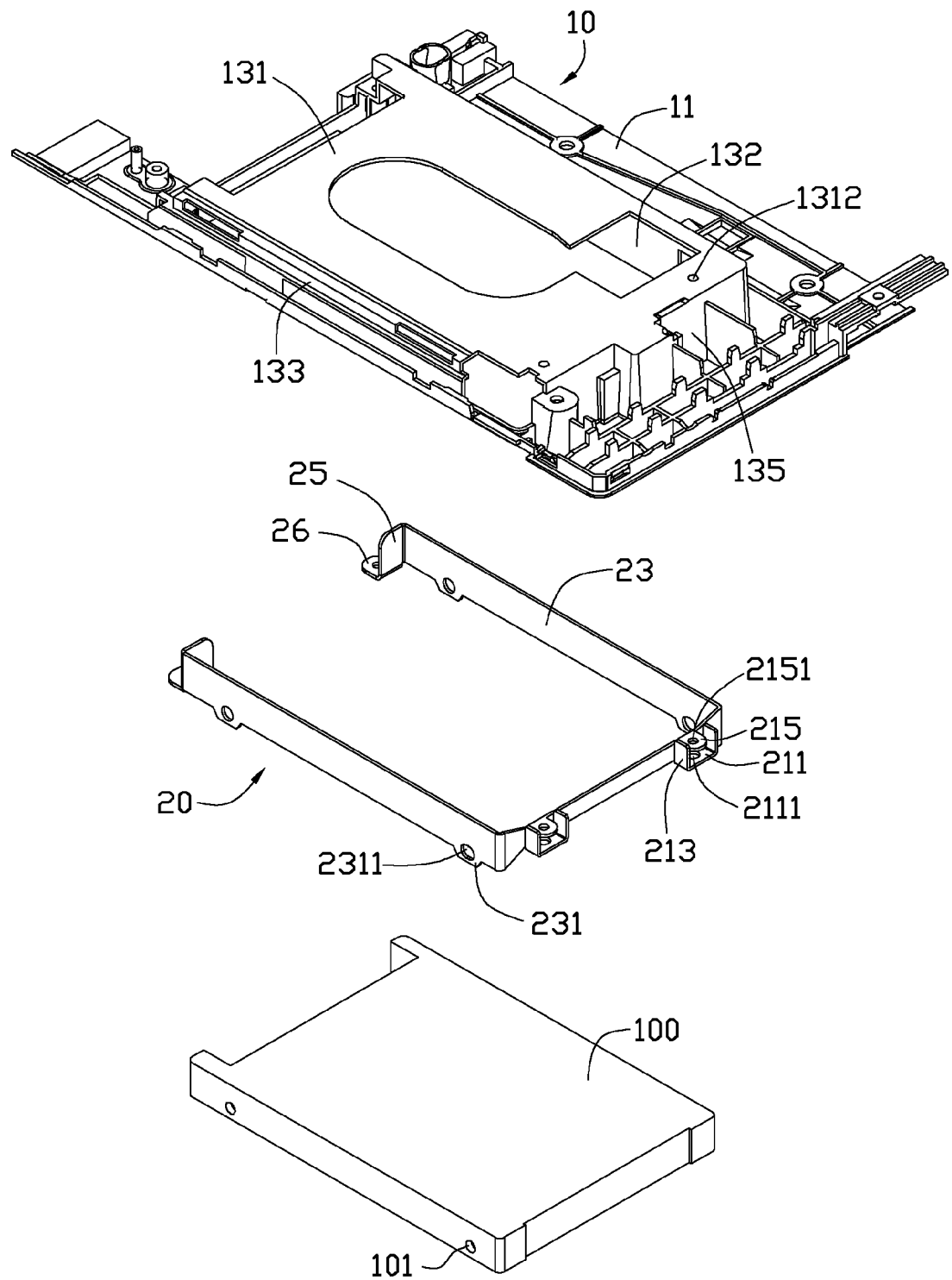
FIG. 2 is similar to FIG. 1, but viewed from a different aspect.

FIG. 1 and FIG. 2, are a mounting device in accordance with an embodiment for securing a hard disk drive 100. The mounting device includes a cage 10 and a frame 20. The cage 10 is a bottom cover of a chassis of en electronic device, such as a notebook or a netbook.

Each of two opposite sides of the hard disk drive 100 defines two mounting holes 101.

The cage 10 includes a covering plate 11 and a receiving space 13 defined in the covering plate 11. The receiving space 13 includes a bottom plate 131, a front plate 132, a rear plate 133, a first side plate 135, and a second side plate 136 opposite to the first side plate 135. The front plate 132 is substantially parallel to the rear plate 133. The first side plate 135 is substantially parallel to the second side plate 136. The bottom plate 131 is substantially perpendicular to the front plate 132, the rear plate 133, the first side plate 135 and the second side plate 136. Two positioning protrusions 1311 (shown as in FIG. 3) are located on the bottom plate 131 adjacent to the first side plate 135. Each of the two positioning protrusions 1311 defines a positioning hole 1312 (shown in FIGS. 2 and 3). The positioning hole 1312 extends through the bottom plate 131. In one embodiment, a top surface of each of the two positioning protrusions 1311 is substantially parallel to the bottom plate 131. The second side plate 136 is connected to the bottom plate 131 through a first connecting piece 1361 and a second connecting piece 1362. In one embodiment, the first connecting piece 1361 is substantially perpendicular to the second connecting piece 1362 and the second side plate 136, and the second connecting piece 1362 is substantially perpendicular to the bottom plate 131. A positioning post 1363 extends from the first connecting piece 1361. The positioning post 1363 defines a securing hole 1365.

The frame 20 includes a mounting plate 21 and two limiting plates 23 extending from two opposite ends of the mounting plate 21. In one embodiment, the two limiting plates 23 are substantially parallel to each other and perpendicular to the mounting plate 21. Two first mounting pieces 211 extend from a top edge of the mounting plate 21. Two second mounting pieces 215 extend from a bottom edge of the mounting plate 21 opposite to the top edge. In one embodiment, the two first mounting pieces 211 are substantially perpendicular to the mounting plate 21 and the two limiting plates 23. Each of the two first mounting pieces 211 defines a first mounting hole 2111. Two positioning pieces 213 extend from two opposite sides edges of each of the two first mounting pieces 211. In one embodiment, the two positioning pieces 213 are substantially perpendicular to the mounting plate 21 and each of the two first mounting pieces 211. The two second mounting pieces 215 are substantially parallel to the two first mounting pieces 211. Each of the two second mounting pieces 215 defines a second mounting hole 2151. Each of the two second mounting pieces 215 is located between the two positioning pieces 213. The second mounting hole 2151 is aligned with the first mounting hole 2111. Two locking pieces 231 extend from a top edge of each of the two limiting plates 23. Each of the two locking pieces 231 defines a locking hole 2311. The locking hole 2311 corresponds to each of the two mounting holes 101. A securing piece 25 extends from each of the two limiting plates 23. The securing piece 25 of each of the two limiting plates 23 extend towards to each other and are opposite to the mounting plate 21. An installation piece 26 extends from the securing piece 25 away from the mounting plate 21. In one embodiment, the installation piece 26 is substantially perpendicular to the securing piece 25, and the securing piece 25 is substantially perpendicular to each of the two limiting plates 23. The installation piece 26 defines an installation hole 261 corresponding to the securing hole 1365.

Figure 3:
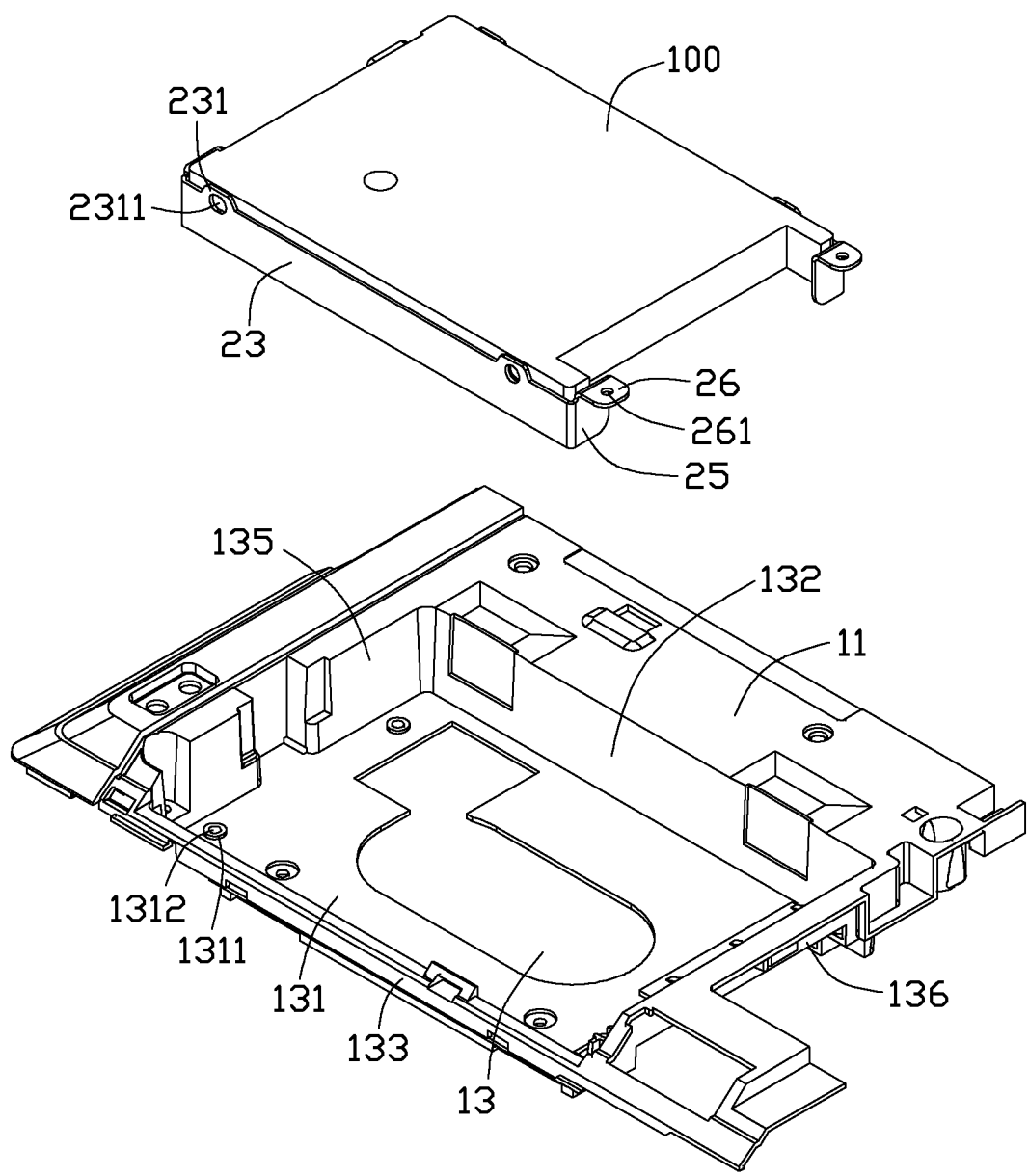
FIG. 3 is an isometric view of partially assembled of the mounting device and the hard disk drive of FIG. 1.
Figure 4:
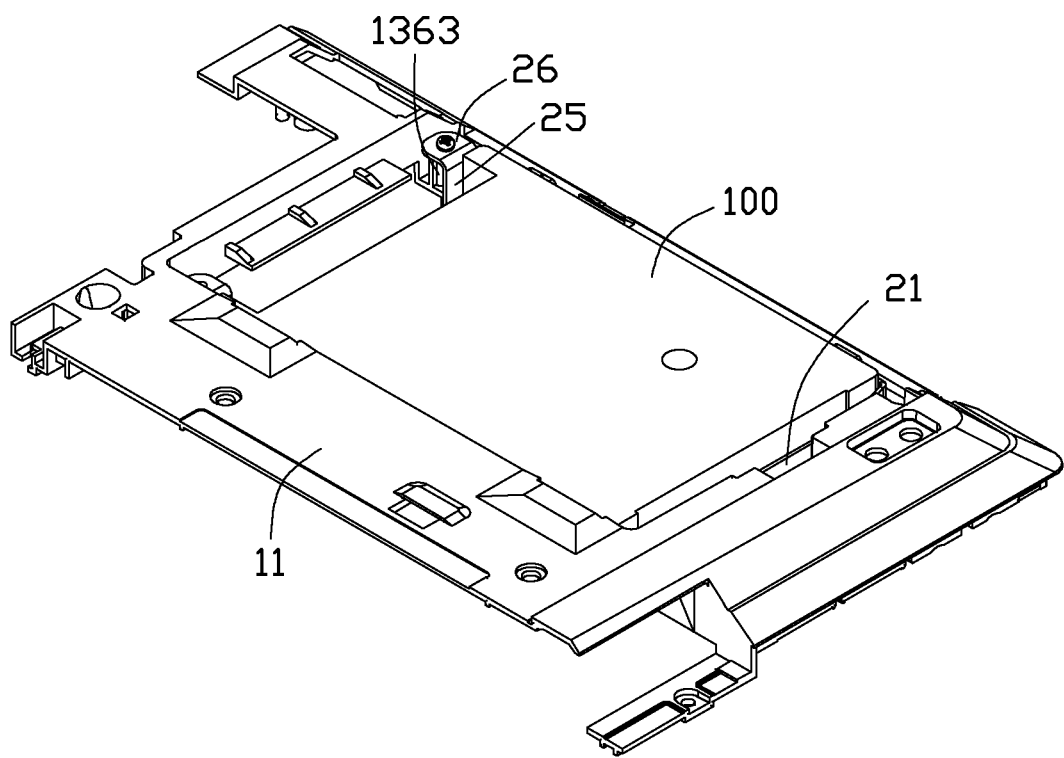
FIG. 4 is an assembled, isometric view of the mounting device and the hard disk drive of FIG. 1.

FIG. 3 and FIG. 4, show in assembly, the hard disk drive 100 is plated in the frame 20, and each of the two mounting holes 101 is aligned with the locking hole 2311. A first locking member, such as a screw, is inserted into the locking hole 2311 and each of the two mounting holes 101, to secure the hard disk drive 100 to the frame 20. The frame 20 with the hard disk drive 100 is placed in the receiving space 13. The installation piece 26 abuts the positioning post 1363. The second mounting hole 2151 is aligned with the positioning hole 1312. A second locking member, such as a screw, is inserted into the installation hole 261 and the securing hole 1365. A third locking member, such as a screw, is inserted into the first mounting hole 2111, the second mounting hole 2151 and the positioning hole 1312. The frame 20 is then mounted to the receiving space 13. In this position, each of the two second mounting pieces 215 abuts each of the two positioning protrusions 1311, each securing piece 25 abuts the second connecting piece 1362, and a bottom edge of each securing piece 25 abuts the bottom plate 131. Each of the two limiting plates 23 abuts the front plate 132 and the rear plate 133, and a bottom edge of each of the two limiting plates 23 abuts the bottom plate 131. A side edge of each of the two positioning pieces 213 abuts the first side plate 135, and a bottom edge of each of the two positioning pieces 213 abuts the bottom plate 131. Thus, when the frame 20 is jolted along a direction perpendicular to the bottom plate 131, the mounting plate 21 is prevented from jolting loose to fall against the bottom plate 131.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A hard disk drive mounting device comprising:
   a cage comprising a bottom plate, the bottom plate defining a receiving space, the bottom plate comprising a positioning protrusion; and
   a frame, received in the receiving space, comprising a mounting plate and two limiting plates, and the two limiting plate being configured to secure a hard disk drive therebetween; and a gap being defined between the mounting plate and the bottom plate;
   wherein a positioning protrusion is located on the bottom plate; a first mounting piece and a second mounting piece extend from the mounting plate, and two positioning pieces extend from the first mounting piece; the second mounting piece abuts the positioning protrusion, each of the first mounting piece and the second mounting piece is secured to the positioning protrusion, and each of the two positioning pieces abuts the bottom plate, so that the second mounting piece is prevented from jolting towards the bottom plate.

2. The hard disk drive mounting device of claim 1, wherein the first mounting piece is substantially parallel to the second mounting piece and substantially perpendicular to the mounting plate.

3. The hard disk drive mounting device of claim 1, wherein the two positioning pieces are substantially perpendicular to the mounting plate and the second mounting piece.

4. The hard disk drive mounting device of claim 1, wherein the second mounting piece is located between the first mounting piece and the positioning protrusion.

5. The hard disk drive mounting device of claim 1, wherein the two positioning pieces extend from two opposite ends of the first mounting piece, and the second mounting piece is located between the two positioning pieces.

6. The hard disk drive mounting device of claim 1, wherein a locking piece extends from each of the two limiting plates, the locking piece defines a locking hole, and the locking hole is configured to secure the hard disk drive.

7. The hard disk drive mounting device of claim 1, wherein the receiving space is further defined between a first side plate and a second side plate, and the first side plate is substantially parallel to the second side plate; the positioning protrusion is adjacent to the first side plate; the cage further comprising a first connecting piece and a second connecting piece, both the first connecting piece and the second connecting piece connect the second side plate to the bottom plate, the first connecting piece is substantial perpendicular to the second side plate, and the second connecting piece is substantially perpendicular to the first connecting piece and the bottom plate.

8. The hard disk drive mounting device of claim 7, wherein the frame further comprising a securing piece extending from each of the two limiting plates, and the securing piece abuts the second connecting piece.

9. The mounting device of claim 7, wherein a positioning protrusion is located in the first connecting piece, an installation piece extends from the securing piece, and the installation piece abuts the positioning protrusion and is secured the positioning protrusion.

10. The hard disk drive mounting device of claim 9, wherein the installation piece is substantially perpendicular to the securing piece, and the securing piece is substantially perpendicular to the two limiting plates.

11. A hard disk drive mounting device comprising:
    a cage comprising a bottom plate, the bottom plate defining a receiving space, the bottom plate comprising a positioning protrusion; and
    a frame, received in the receiving space, comprising a mounting plate and two limiting plates, and the two limiting plate being configured to secured a hard disk drive therebetween; and a gap being defined between the mounting plate and the bottom plate;
    wherein a positioning protrusion is located on the bottom plate; a first mounting piece and a second mounting piece extend from the mounting plate, two positioning pieces extend from two opposite ends of the first mounting piece, and the second mounting piece is located between the two positioning pieces; the second mounting piece abuts the positioning protrusion, each of the first mounting piece and the second mounting piece is secured to the positioning protrusion, and each of the two positioning pieces abuts the bottom plate, so that the second mounting piece is prevented from jolting towards the bottom plate.

12. The hard disk drive mounting device of claim 11, wherein the first mounting piece is substantially parallel to the second mounting piece and substantially perpendicular to the mounting plate.

13. The hard disk drive mounting device of claim 11, wherein each of the two positioning pieces is substantially perpendicular to the mounting plate and the second mounting piece.

14. The hard disk drive mounting device of claim 11, wherein the second mounting piece is located between the first mounting piece and the positioning protrusion.

15. The hard disk drive mounting device of claim 11, wherein a locking piece extends from each of the two limiting plates, the locking piece defines a locking hole, and the locking hole is adapted to secure the hard disk drive cooperate with a mounting hole defined in the hard disk drive.

16. The hard disk drive mounting device of claim 11, wherein the receiving space is defined between a first side plate and a second side plate, and the first side plate is substantially parallel to the second side plate; the positioning protrusion is adjacent to the first side plate; the cage further comprising a first connecting piece and a second connecting piece, both the first connecting piece and the second connecting piece connect the second side plate to the bottom plate, the first connecting piece is substantial perpendicular to the second side plate, and the second connecting piece is substantially perpendicular to the first connecting piece and the bottom plate.

17. The hard disk drive mounting device of claim 16, wherein the frame further comprises a securing piece extending from each of the two limiting plates, and the securing piece abuts the second connecting piece.

18. The hard disk drive mounting device of claim 16, wherein a positioning protrusion is located in the first connecting piece, an installation piece extends from the securing piece, and the installation piece abuts the positioning protrusion and is secured the positioning protrusion.

19. The hard disk drive mounting device of claim 18, wherein the installation piece is substantially perpendicular to the securing piece, and the securing piece is substantially perpendicular to the two limiting plates.

* * * * *